W. CUNLIFF.
Stove-Door Knob.

No. 210,673.             Patented Dec. 10, 1878.

WITNESSES
Ed. J. Nottingham
A. W. Bright

INVENTOR
Wm Cunliff.
By H. A. Seymour.
ATTORNEY

UNITED STATES PATENT OFFICE.

WILLIAM CUNLIFF, OF PROVIDENCE, RHODE ISLAND.

IMPROVEMENT IN STOVE-DOOR KNOBS.

Specification forming part of Letters Patent No. 210,673, dated December 10, 1878; application filed January 5, 1878.

*To all whom it may concern:*

Be it known that I, WILLIAM CUNLIFF, of Providence, in the county of Providence and State of Rhode Island, have invented certain new and useful Improvements in Stove-Door Knobs; and I do hereby declare the following to be a full, clear, and exact description of the invention, such as will enable others skilled in the art to which it pertains to make and use it, reference being had to the accompanying drawings, which form part of this specification.

My invention relates to improvements in stove-door knobs, and is designed to furnish a bolt for securing the knob to the door, which bolt shall at the same time serve as a strengthening device, adapted to resist the crushing-strain imposed upon the knob by clamping it to the door.

The invention consists in the combination, with the knob, of a fastening-bolt provided, respectively, at both ends with a shoulder and a nut or other suitable device for clamping the same to the door.

Figure 1:
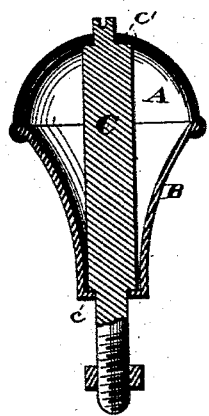
Figure 2:
Figure 3:

Referring to the drawings, Figure 1 is a central longitudinal section of a knob provided with my improvement, and Fig. 2 represents the latter detached from the knob. Fig. 3 is a view of a modification of the invention.

The knob may be made of any suitable material, having the two transverse sections A and B, which latter may be ornamented or provided with perforations, or not, as desired. They are secured together by an annular flange on one of the same, seating over a corresponding shoulder or projection formed on the other section; or any other means may be used for accomplishing the result, my invention being entirely independent of such constructions.

The fastening device which secures the knob to the door consists in the bolt C, which is provided at its outer extremity with any desirable head or device for securing it to the outer face of the knob; or the end may be swaged over the knob, or may be formed in any suitable manner, as the same is immaterial to my invention. The opposite extremity of the bolt is provided with exterior screw-threads to engage with the ordinary nut, which latter clamps the bolt and knob to the stove. Other means can readily occur to one for obtaining the same end accomplished by this exterior-threaded end portion of the bolt and the nut connecting therewith; and I show this means of connection only by way of illustration, as any other suitable engagement may be substituted for the same.

The bolt C is made with the two shoulders $c\,c'$, formed, respectively, at its inner and outer ends, and which are adapted to fit against the inner faces of the two sections of the knob, so that as the nut draws the bolt tightly against the knob in securing the latter to the door, the crushing-strain may be borne by these two shoulders, and the knob thus relieved from all force thereof.

I have shown in Figs. 1 and 2 my preferred manner of forming this bolt, with the annular shoulders $c\,c'$, respectively, at both end portions thereof; but, instead of making either one or both of these bearing-formations in the manner shown, any other equivalent device to give bearing to the inner face of the sections of the knob may be employed—such as a stud, lug, or other similar construction.

In Fig. 3 I show a bolt with the two bearing-shoulders formed as collars thereon, so that the body of the bolt between the shoulders is of the same diameter as the end portions exterior to said shoulders.

By tightening the bolt-nut the head of the bolt is caused to bear tightly against that portion of the knob placed between it and the shoulder $c'$ of the bolt; but by means of the latter the entire strain is transposed from the knob to the said shoulder. A similar result obtains as regards the portion of the knob clamped between the shoulder $c$ and the stove-door, so that the force applied in securing the knob to the latter is not exerted in a pressure upon the face and side of the same, but is transferred to and borne entirely by the shoulders formed on the bolt.

I do not claim, broadly, a bolt adapted to resist the crushing-strain imposed upon the knob in clamping the latter to a stove-door, but restrict my invention to the formation of a bolt provided with the two end shoulders, as stated in the following claim.

Having fully described my invention, what I claim as new, and desire to secure by Letters Patent, is—

The combination, with a stove-door knob, of a door-fastening bolt provided at both end portions with the bearing-shoulders and the door-clamping device, substantially as described.

In testimony that I claim the foregoing I have hereunto set my hand this 2d day of January, 1878.

WILLIAM CUNLIFF.

Witnesses:
 A. B. RICE,
 ADDISON B. RICE.